Sept. 14, 1954  V. SIMON ET AL  2,688,994
ROTARY VEGETABLE CUTTING DEVICE
Filed Oct. 18, 1950  4 Sheets-Sheet 1
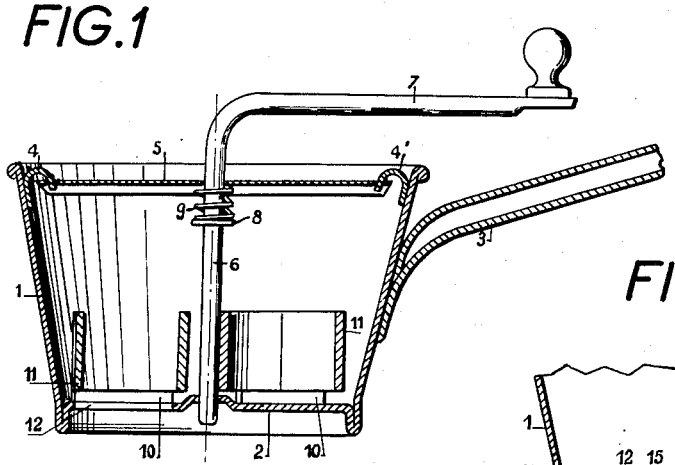
FIG.1
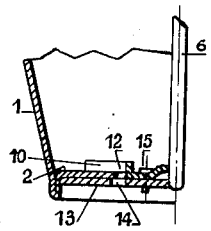
FIG.5
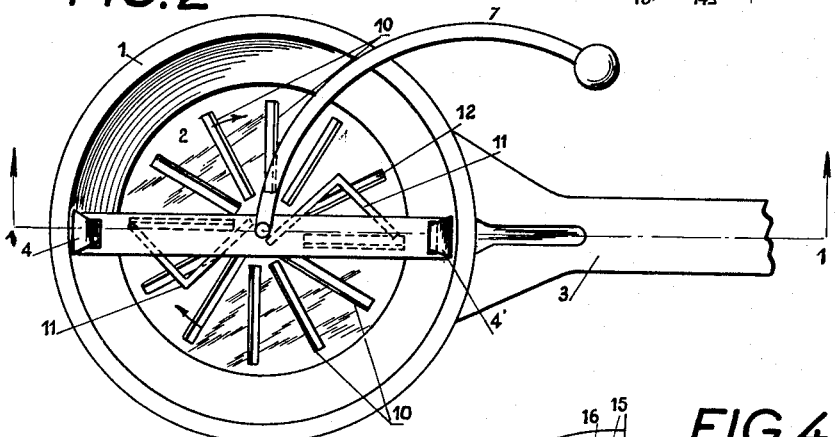
FIG.2
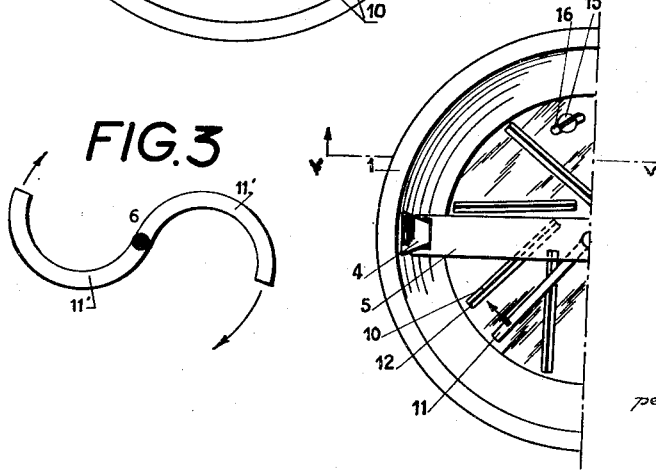
FIG.3
FIG.4
INVENTORS
VICTOR SIMON
RICHARD DENIS Sept. 14, 1954  V. SIMON ET AL  2,688,994
ROTARY VEGETABLE CUTTING DEVICE
Filed Oct. 18, 1950  4 Sheets-Sheet 2

INVENTORS:
VICTOR SIMON
RICHARD DENIS

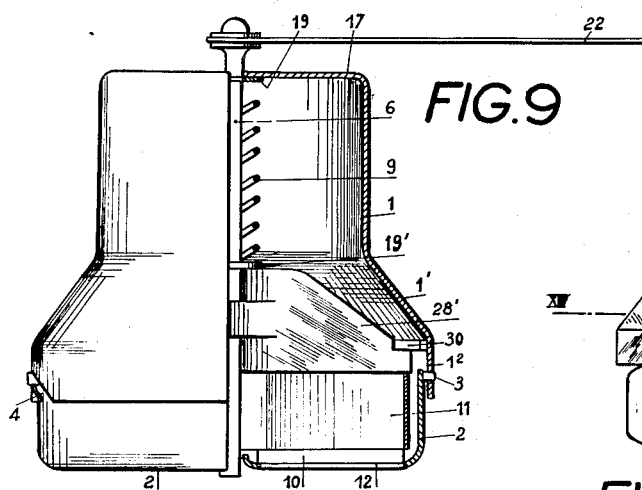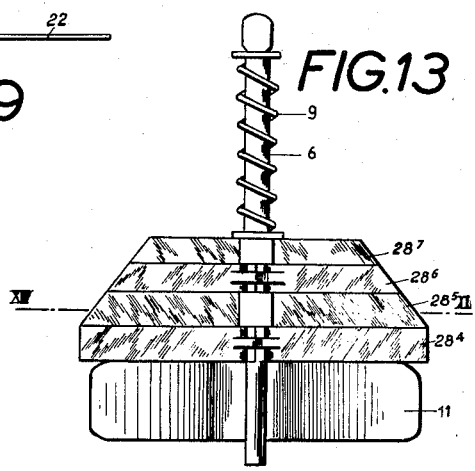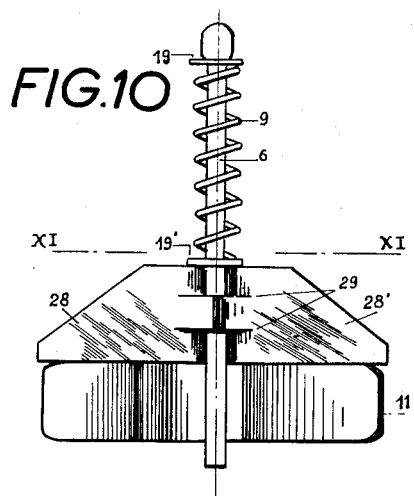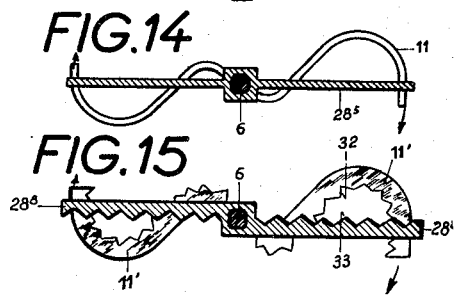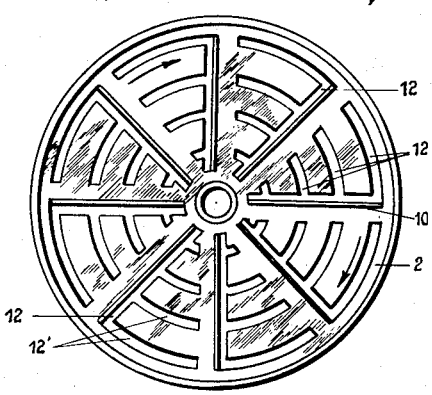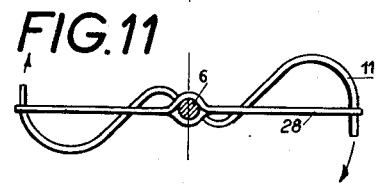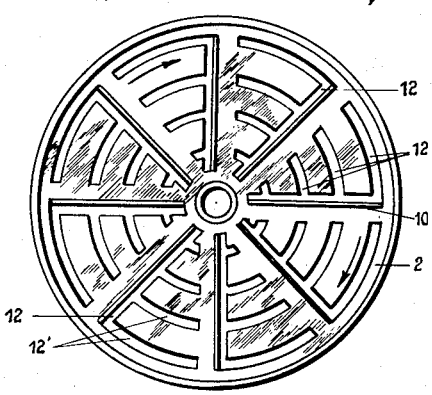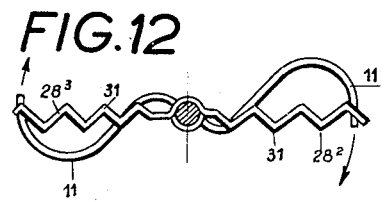

Sept. 14, 1954  V. SIMON ET AL  2,688,994
ROTARY VEGETABLE CUTTING DEVICE
Filed Oct. 18, 1950  4 Sheets-Sheet 4

INVENTORS:
VICTOR SIMON.
RICHARD DENIS.

Patented Sept. 14, 1954

2,688,994

UNITED STATES PATENT OFFICE 2,688,994

ROTARY VEGETABLE CUTTING DEVICE

Victor Simon and Richard Denis, Carnieres, Belgium, assignors to "Sides" Societe Anonyme, Carnieres, Belgium Application October 18, 1950, Serial No. 190,758
Claims priority, application Belgium October 27, 1949

4 Claims. (Cl. 146—167)

The present invention has for its object to provide a kitchen appliance for reducing raw vegetables, chiefly parsley, chervil and the like edible umbellifers to very small pieces.

One of the features of the invention consists in the fact that the bottom of an ordinary receptacle is provided on its inner face with stationary cutters which are adapted to co-operate with at least one movable cutter which is secured to the shaft of an actuating crank and is so arranged as to come angularly into contact with the stationary cutters over the entire length of same so as to cut the vegetables when said shaft is rotated, means being provided, first for ensuring that the cutting edges of the stationary and movable cutters remain in contact when they slide on one another, then for enabling the cut vegetables to be discharged from the receptacle.

The invention will be more clearly understood by means of the ensuing specification made with reference to the figures of the accompanying drawings.

In the accompanying drawings various embodiments of the present invention are shown by way of example.

Fig. 1 is a vertical section through the whole of the cutting device and taken on line I—I of Fig. 2.

Fig. 2 is a plan view thereof, while

Fig. 3 shows a plan view of a modification of the movable cutter.

Fig. 4 is a fragmentary plan view of another modification.

Fig. 5 is a section through the line V—V of Fig. 4.

Fig. 9 is an elevational partly sectional view of a kitchen appliance according to a further modification of our invention.

Fig. 10 is an elevational view of the shaft driving the movable cutters associated with stationary blades fitted on said shaft.

Fig. 11 is a sectional view through line XI—XI of Fig. 10.

Fig. 12 is a plan view of the movable cutter on which rest the blades that are held in their operative position and are provided with vertical folds, the driving shaft being illustrated sectionally.

Fig. 13 shows in elevational view a number of blades fitted on the driving shaft and that are in alternation rigid with said shaft and free with reference thereto.

Fig. 14 is a cross-section through line XIV—XIV of Fig. 13.

Fig. 15 is a plan view of a movable cutter and of a blade resting elastically on the latter according to a modified embodiment of our invention.

Fig. 16 is a plan view of the inner surface of a bottom of the appliance, illustrating a modification in the outline of the cuts in said bottom.

Figure 6:
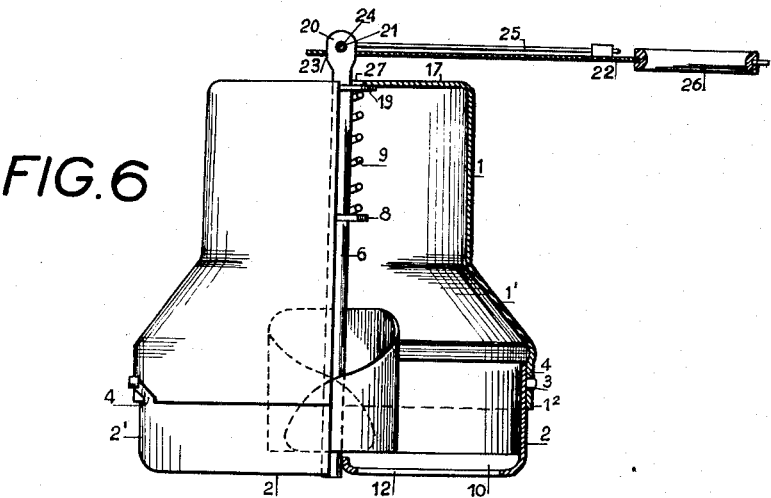
Fig. 6 is an elevational view, partly in section, of the appliance according to another modification.

According to the embodiment shown in Figs. 1 and 2, the device comprises a body 1 or container proper, provided with a bottom 2 and a handle 3; the vegetables to be cut are introduced into said container. This container body 1 is of the ordinary shape of an inverted frustum of a cone, inside which are provided two hook-shaped attachments 4—4¹ adapted to act as a rest for a cross-member 5 that serves as a support for a vertical shaft 6 actuated by a crank 7. The shaft 6 is provided with a washer 8 which retains a coil spring 9 that bears against the cross-member 5 so as to exert a downward pressure on the shaft 6 and retain the cross-member 5 in position in the hooks 4—4¹ by means of slots provided in said cross-member.

The bottom 2 of the container 1 is provided on its inner face with stationary cutters 10 which are adapted to co-operate with cutters 11 secured to the shaft 6. By rotating the shaft 6, the movable cutters 11 are successively and progressively brought into contact with the cutters 10 by the action of the spring 9. As more especially shown in Fig. 2, the cutters 10 are arranged radially on the bottom of the container, whereas the movable cutters 11 are so arranged as always to form a desired angle with said stationary cutters so that, when the shaft 6 is rotated, the cutting edges of the stationary cutters and the movable cutters act like scissors on the vegetables by sliding in contact with one another without being capable of jamming.

In order to enable the particles of the cut vegetables to be discharged, openings 12 are provided in the bottom 2 of the container; said openings are preferably arranged immediately in front of the stationary cutters 10, taking into account the direction of rotation of the movable cutters.

Preferably, the movable cutters are extended upwards in the container, so as to carry the vegetables along and constrain them to assume a position against the stationary cutters and be cut when the movable cutters pass.

In the drawing, the bottom of the container is made in one piece with the container proper.

Referring more particularly to Fig. 3, a modification of construction of the movable cutters 11¹ is shown therein, said cutters being of curved shape in plan view, whereas in Fig. 2 they are of rectangular cross-section.

It is however obvious that the cutters may be of any shape and that similarly, their slope with respect to the bottom needs not necessarily be vertical; they should however be so arranged as to be constantly in contact with at least one stationary cutter 10.

In Fig. 4, another modification of construction is shown according to which the movable cutters 11 are arranged radially with respect to the bottom 2 of the container 1, while the cutters 10 secured to the bottom are so arranged on same as to form, when in contact with the movable cutters 11, a suitable angle therewith for cutting the vegetables.

Beneath the bottom 2 is located a sheet metal disc 13 provided with slots 14 corresponding to the openings 12; the disc 13 is adapted to rotate loose about the shaft 6 and to be held against the bottom 2 in the desired position, by means of a screw 15 which is fixed in the disc 13 and is adapted to slide in a slot 16 provided in the bottom 2. It is thus possible to decrease and adjust the openings 12 at will.

Figure 7:
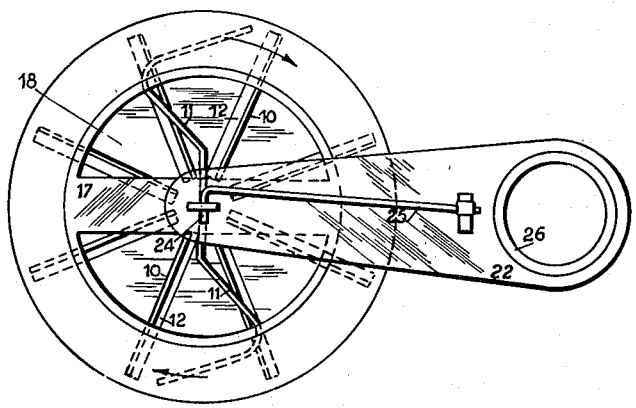
Fig. 7 shows a plan view of the kitchen appliance according to Fig. 6.
Figure 8:
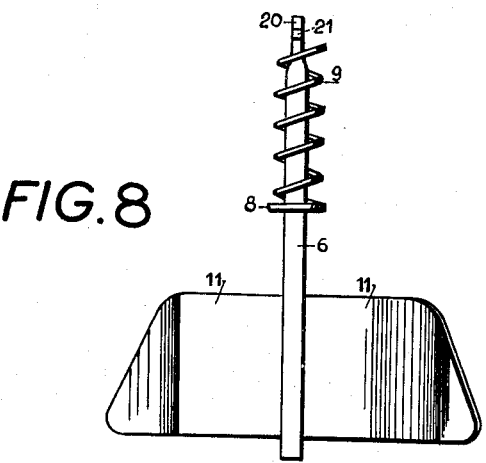
Fig. 8 shows an elevational view of the movable cutters and their actuating shaft.

According to the embodiment shown in Figs. 6, 7 and 8, the appliance comprises two removable portions: (1), a body 1 which forms a rigid cylindrical container and is extended towards its base by a frusto-conical portion 1¹ provided with a cylindrical flange 1², and (2), a bottom 2 provided with an upturned edge 2¹ of such a diameter as to enable it to be engaged with a gentle frictional fit in the flange 1².

In order to retain the bottom 2 in the flange 1² of the body of the container, the upturned edge 2¹ is provided with projections 3 which are adapted to engage in oblique slots 4 provided in the edge 1².

The inner face of the bottom 2 is provided with cutters 10 preceded by openings 12 in the direction of the movement of movable cutters 11 which are secured to a shaft 6; said shaft 6 is journalled on the one hand in the bottom 2, at the centre of which a soldered washer or if desired an embossed portion has been provided to act as a bearing and a guide for said shaft, and on the other hand in the head 17 that forms a fixed cover for the container body 1. This cover 17 is provided with openings 18 for introducing into the container the raw vegetables to be treated, so that said cover merely forms a cross-member adapted to guide and support the upper part of the shaft 6.

The movable cutters 11 are angle-shaped and their upwardly extending free edge tapers away upwardly from the inner wall of the container, so as to favour the retention by the walls, of the vegetables to be reduced to small pieces.

In order to keep the stationary cutters 10 and the movable cutters 11 in contact with one another, the shaft 6 has secured thereto a washer 8, against which is adapted to bear with one of its ends a coil spring 9, the other end of which is adapted to bear against the cross member 17 secured to the body of the container 1, optionally with the interposition of a washer 19.

The upper end of the shaft 6 is flattened so as to form a head 20 in which is provided a transverse opening 21. A crank 22 provided with a recess 23 is engaged through said recess over the head 20 and is held thereon by a key 24 mounted at the end of a metal rod 25, the other end of which is secured to the crank 22.

By means of this keying, the crank is secured to the shaft 6; for removing the crank, the key 24 is withdrawn by exerting a vertical pull on the flexible rod 25.

The crank 22 that actuates the shaft 6 secured to the cutters 11 is provided with an opening bounded by a ring 26 in which can be engaged a finger of the operator's hand, for rotating the crank and consequently the shaft 6.

Owing to its reduced diameter over a portion of the height of the body 1 of the container, the appliance can be readily held in the hand, thereby avoiding the use of a handle, while a finger of the other hand having been inserted in the ring 26, the shaft 6 and consequently the movable cutters 11 can be very easily rotated at a higher speed and much more quickly than by using a crank with a handle.

The assembling and disassembling of the appliance, in particular for cleaning it, are, according to Figs. 6, 7 and 8, extremely simple. Preferably, the key 24 is disengaged from its housing 21, thereby enabling the crank 22 to be removed.

The bottom 2 is then slightly rotated so as to disengage the projections 3 from the oblique slots 4. The bottom 2 can thus be easily removed from the body of the container 1—1¹, while the movable cutters 11 and the shaft 6 can also be disengaged from the body 1. For this purpose, small recesses 27 provided in the cross-member 17 allow the flattened head 20 of the shaft 6 to pass.

In the modified embodiments illustrated in Figs. 9 to 16, the container includes two removable parts, to wit:

(1) An upper body 1 forming a rigid cylindrical container that extends downwardly towards its base under the form of a frusto-conical part 1¹ provided with a cylindrical flange 1².

(2) A bottom 2 provided with an upwardly bent flange 2¹ of a diameter such that it may engage with slight friction the flange 1².

In order to hold said bottom 2 inside the flange 1², the latter is provided at its lower end with slots 4 wherein may engage studs 3 suitably secured to the upturned edge 2¹.

The inner surface of the bottom 2 is provided with cutters 10 in front of which are cut openings 12, said openings preceding the cutters in the direction of movement of the movable cutters 11 that are rigid with the shaft 6 carried in bearings mounted on one hand on the bottom of the container and on the other in the stationary cover 17 of the body 1 of the container.

Over the shaft 6 and above the location of the movable cutters 11 are slidingly fitted blades 28 the lower edges of which are held elastically in contact with the upper cutting edge of the movable cutters 11 through the agency of a coil spring 9 surrounding the shaft 6 and one of the ends of which engages the upper edge of the blades 28 while the other end of the spring bears against the cross member or cover 17 of the body 1 of the container, with the possible interposition between the ends of the spring and the bearing surfaces therefor of washers 19 and 19¹.

As more particularly apparent from inspection of Figs. 10 and 11, the stationary blades 28 that are carried by the shaft 6 over which they are adapted to slide are made of a plate of steel provided with two parallel notches 29 whereby it is possible to provide in said plates an axial deformation so as to clamp the shaft 6 through this deformation and consequently the plate forming the blades 28—28¹ may slide freely over said shaft.

Through rotation of the crank 22, the shaft 6 is driven along in the same rotary movement, which has for its result to make the movable cutters 11 rotate over the stationary cutters at the bottom of the container. The blades 28 through their contact with the movable cutters 11 are temporarily carried along by them until one of them meets a stop 30 provided inside the body 1.

The parsley introduced through a suitable opening provided at the upper end of the body 1 is cut a first time by the blades 28 and the cutters 11 which makes the downward movement of the parsley easier and forms a better preparation before the final cutting executed by the cutters 11 and 10.

The incorporation of the blades 28 and 28¹ is similarly possible in the case of a container made in one piece as illustrated in Figs. 1 and 2.

Referring more particularly to Fig. 12, the movable cutter 11 cooperates with the blades 28² and 28³ that assume a vertically folded shape as shown at 31 whereby the vegetables are held in such folds and are cut more easily.

In Figs. 13 and 14, the superposed blades 28⁴ to 28⁷ are fitted over the shaft 6, the lowermost blade being held against the movable cutter 11 under the action of a spring 9 acting on the upper blade 28⁷.

The blades 28⁴ and 28⁶ are freely fitted over the shaft 6 and are held against rotation therewith when the said shaft is caused to rotate through contact with a stop rigid with the body of the container as already illustrated in Fig. 9. As to the blades 28⁵ and 28⁷, they are angularly rigid with the shaft 6 and are carried along with it. For this purpose, the shaft 6 assumes a hexagonal, square or flat cross-section corresponding to a central recess formed in said blades 28⁵—28⁷, whereby said blades are carried along by the rotating shaft 6 and cut the vegetables in cooperation with the blades 28⁴ and 28⁶ previous to the already described action of the movable cutters 11.

Thus comparatively large-sized vegetable material is submitted to a preliminary subdivision into reduced particles dropping on to the bottom of the container on which it is to be cut to the desired size between the stationary cutters 10 and the movable cutters 11.

Referring to Fig. 15, it shows movable cutters 11¹ the horizontal surfaces of which are flat while having however a slightly sloping input and the sides facing the direction of rotation are provided with projections 32 forming teeth for instance as illustrated, whereas the blade 28⁸ is provided also with a flat edge and has on the side opposed to the direction of rotation of the shaft 6, similar projections. Thus the vegetables to be cut are properly held and cannot escape the action of the cutters executed as disclosed.

To the front of the slot 12, there are preferably provided cuts 12¹ opening into said slots in order to further the dropping out of the material that has been cut. This arrangement provided to the front of the cutters 10 may assume possibly the shape of a cut-out comb as illustrated in Fig. 16. Furthermore, the greater development of the cut-out portion in the bottom reduces substantially the rigidity of said bottom and increases the amplitude of the vibrations to which the latter is submitted as a consequence of the rotation of the movable cutters 11 over the stationary cutter 10.

Figure 17:
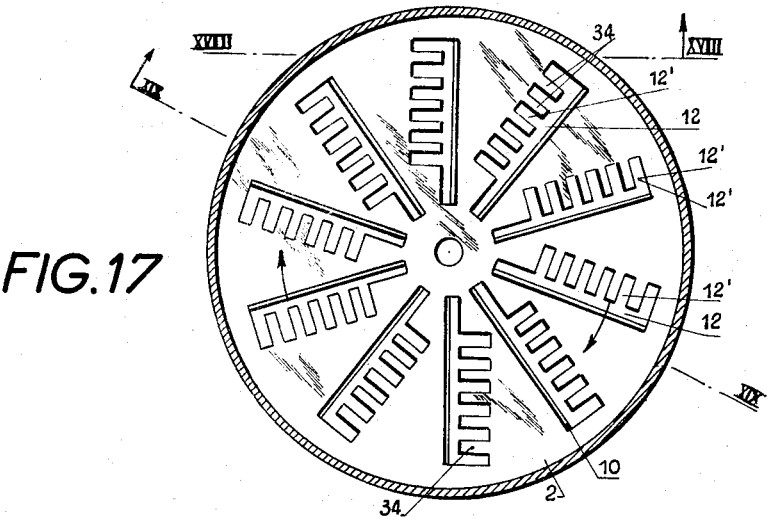
Fig. 17 is a plan view of a further modification of the bottom of the appliance.
Figure 18:
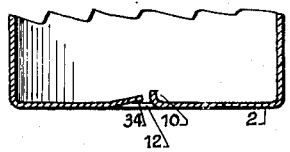
Fig. 18 is a cross-section through line XVIII—XVIII of Fig. 17.
Figure 19:
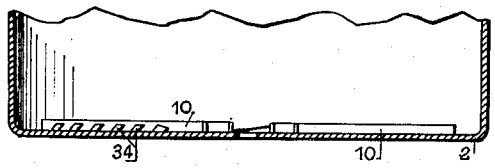
Fig. 19 is a cross sectional view through line XIX—XIX of Fig. 17.

In the embodiment illustrated in Figs. 17, 18 and 19, the bottom 2 carries on its inner surface stationary cutters 10 cooperating with at least one movable cutter that is not illustrated.

Openings 12 are provided in front of the stationary cutters 10 and precede the latter in the direction of movement of the movable cutters so as to allow the removal therethrough of the vegetable articles. Into said openings 12 there open slots 12¹ arranged preferably in parallelism; the slots 12¹ that may appear under the form of notches, cuts or the like, form in the bottom of the container tongues or teeth 34 that vibrate during the rotation of the movable cutters over the stationary cutters so as to make the release of the small particles obtained during the cutting easier.

According to the invention, the teeth 34 are bent upwardly and the tips of said teeth remain at a certain vertical distance underneath the edge of the stationary cutters 10, said distance being defined in accordance with the desired fineness of cut. The result of such an arrangement is that the vegetables are constrained to rise over the slope formed by the folded material constituted by the teeth 34 of the comb-shaped openings, whereby with the same stationary cutters, the fineness of cut depends on the slope given to the comb teeth 34, taking into account the flexibility of said teeth when submitted to the action of the movable cutters passing over them. Said slight flexibility increases furthermore the amplitude of the desired vibrations of these teeth; thus, according as to whether the teeth 34 are more or less high with reference to the stationary cutters, it is possible to reduce or to increase the size of the cut particles when the movable cutters are caused to revolve over the stationary cutters.

Thus the appliances adapted to comminute vegetables may be obtained in mass production with the same machinery, the extent of the cutting performed being modified through a mere modification in the slope of the teeth 34. The raising of the teeth allows furthermore preventing, when the vegetables are cut into small fragments, the flat leaves such as those of certain varieties of parsley to be cut into slices by the movable cutters as occurred therefore, such slices passing readily through the openings 12 in other types of machines.

The raising of the teeth produces an increased friction at various points of the bottom and constrains the vegetable material to appear between the movable cutters and the stationary cutters in a suitable position for it to be comminuted into very small particles that are always smaller when the upper ends of the teeth come nearer the level of stationary cutters.

Our invention has been described and illustrated by way of a mere exemplification and by no means in a binding sense and obviously various modifications may be brought to its details without unduly widening its scope as defined in accompanying claims.

What we claim is:

1. In a cutting apparatus, in combination, an elongated casing; a plurality of stationary knives rigidly mounted in said casing and having shearing edges arranged in a surface of revolution having its axis substantially in the center of said casing extending in longitudinal direction thereof; a shaft mounted in said casing coaxial with said axis of said surface of revolution and rotatable thereabout; a rotary knife mounted on said shaft for turning therewith, said knife having a shearing edge adapted to contact during rotation said shearing edges of said stationary knives and shaped so as to be located during such rotation in said surface of revolution, said rotary knife being in said surface of revolution angularly arranged with respect to said stationary knives so that in any rotational position of said rotary knife the edge thereof contacts the edge of at least one of said stationary knives; resilient means in said casing permanently urging said rotary knife in a direction toward said stationary knives so as to retain the edge of said rotary knife in permanent yieldable contact with the edge of at least one of the stationary knives; means for rotating said shaft while said rotary knife is urged against said stationary knives, whereby during rotation of the shaft said rotary knife will always be supported by and pressed against the edge of at least one of said stationary knives so as to be prevented from being forced between two consecutive stationary knives, blocking its turning; a blade member mounted on said shaft above said rotary knife with its longitudinal edge urged into contact with the adjacent edge of said rotary knife by said resilient means; and stop means on the wall of said casing adapted to engage said blade member, so that said blade member is rotatable with said rotary knife until it engages said stop means, whereby material placed in said casing may undergo preliminary cutting by shearing action between the contacting edges of said rotary knife and said blade member.

2. A device such as defined in claim 1, wherein a plurality of blade members are provided on said shaft in juxtaposed relation with adjacent longitudinal edges urged into contact with each other by said resilient means, alternate blade members being adapted to be held against rotation by said stop means while the remaining blade members are free to rotate with said shaft and said rotary knife.

3. A device such as defined in claim 1, wherein said blade member is formed with teeth extending along the axis of said casing.

4. A device such as defined in claim 1, wherein said rotary knife is curved along its length and is formed on its curved face with teeth projecting therefrom, and said blade member is formed with teeth on one face thereof projecting in a direction opposite and facing the projecting teeth of said rotary knife.

References Cited in the file of this patent

UNITED STATES PATENTS

| Number | Name | Date |
|---|---|---|
| 50,465 | Gifford | Oct. 17, 1865 |
| 351,100 | Droston | Oct. 19, 1886 |
| 509,564 | Zehe | Nov. 28, 1893 |
| 521,279 | Wright | June 12, 1894 |
| 1,218,079 | Govinlock | Mar. 6, 1917 |
| 1,229,918 | Dye | June 12, 1917 |
| 1,517,624 | Girard et al. | Dec. 2, 1924 |
| 1,890,103 | Watson | Dec. 6, 1932 |
| 2,188,195 | Vanoenacker | Jan. 23, 1940 |
| 2,414,075 | Walker | Jan. 7, 1947 |

FOREIGN PATENTS

| Number | Country | Date |
|---|---|---|
| 15,969 | Germany | Nov. 4, 1881 |
| 7,328 | Denmark | Feb. 11, 1905 |
| 390,035 | France | Sept. 24, 1908 |
| 390,350 | Germany | Feb. 18, 1924 |
| 361,444 of 1931 | Great Britain | May 28, 1931 |
| 527,515 | Germany | June 18, 1931 |
| 510,268 | Great Britain | July 31, 1939 |